July 23, 1968  J. V. ALBEDYLL ETAL  3,393,619
AUTOMATIC EXPOSURE CONTROL FOR PHOTOGRAPHIC CAMERAS
Filed May 12, 1965                                    2 Sheets-Sheet 1

INVENTOR.
JOACHIM v. ALBEDYLL
GERD KIPER
BY
Michael J. Striker

July 23, 1968   J. V. ALBEDYLL ET AL   3,393,619
AUTOMATIC EXPOSURE CONTROL FOR PHOTOGRAPHIC CAMERAS
Filed May 12, 1965   2 Sheets-Sheet 2

INVENTOR.
JOACHIM v. ALBEDYLL
GERD KIPER
BY
Michael J. Striker

United States Patent Office 3,393,619
Patented July 23, 1968

3,393,619
AUTOMATIC EXPOSURE CONTROL FOR PHOTOGRAPHIC CAMERAS
Joachim v. Albedyll, Munich, and Gerd Kiper, Unterhaching, near Munich, Germany, assignors to Agfa Aktiengesellschaft, Leverkusen, Germany
Filed May 12, 1965, Ser. No. 455,107
Claims priority, application Germany, May 15, 1964, A 46,067
10 Claims. (Cl. 95—10)

ABSTRACT OF THE DISCLOSURE

The diaphragm of a camera is adjustable by a ring which is movable from cocked position through a number of intermediate positions each of which corresponds to a different f/stop. The ring is arrested in an intermediate position in response to a change in the condition of a relay whose condition changes with a delay which is a function of scene brightness. A release member releases the ring for movement from cocked position and simultaneously completes the relay circuit.

---

The present invention relates to photographic cameras. More particularly, the invention relates to an automatic exposure control for such cameras. Still more particularly, the invention relates to an arrangement for automatically selecting the size of the exposure aperture in a photographic camera.

It is an important object of the present invention to provide a very simple, rugged and reliable automatic exposure control for photographic cameras.

Another object of the invention is to provide a novel arrangement for automatically selecting the size of the exposure aperture as a function of the intensity of light coming from the viewed scene or object.

A further object of the invention is to provide a novel electric delay circuit which may be utilized in an exposure aperture selecting arrangement of the just outlined characteristics.

An additional object of the present invention is to provide an arrangement for automatically selecting the size of the exposure aperture as a function of the intensity of light coming from the viewed scene or object and for automatically actuating the shutter mechanism in response to proper selection of the exposure aperture.

Still another object of the invention is to provide an arrangement for automatically selecting the size of an exposure aperture which is defined by the vanes of an iris diaphragm.

A further object of the invention is to provide an arrangement of the above outlined type which will automatically cock the diaphragm setting means upon completion of an exposure and which will automatically block the diaphragm setting means in cocked position.

A concomitant object of the invention is to provide an arrangement for automatically selecting the size of the exposure aperture in photographic cameras of the type wherein the setting means for the diaphragm mechanism may be cocked in automatic response to operation of the film transporting mechanism, in automatic response to operation of the cocking means of the shutter mechanism, and/or in automatic response to another operation which is carried out in order to prepare the cameras for an exposure.

Briefly stated, one feature of our invention resides in the provision of a camera which includes a diaphragm mechanism having movable vane means defining a variable exposure aperture, setting means connected with the vane means and rotatable or otherwise movable through a series of intermediate positions between a cocked position and an end position, an electric delay circuit including a source of electrical energy, photoelectric resistor means positioned for full illumination by light coming from the viewed scene or object so that the resistance of the resistor means is a function of the intensity of such light, and relay means arranged to assume conditions of energization and deenergizaton and to change its condition with a delay which is a function of the resistance of the resistor means, arresting means for arresting the setting means in response to delayed change in condition of the relay means, and release means for initiating movement of the setting means from cocked position and for completing or for completing and opening the circuit so that the delayed change in condition of the relay means takes place while the setting means moves from the cocked position and reaches that intermediate position in which the size of the exposure aperture is a function of the intensity of light coming from the viewed scene or object.

The arresting means may comprise a lever which is provided with a pawl movable into or out of engagement with one of a series of teeth provided on the setting means. The relay may be enregized on completion of the circuit by the release means to attract the lever against the bias of a spring and to thereby move the pawl into engagement with a selected tooth of the setting means. Alternatively, the relay may be energized in response to closing of the circuit by the release means; the relay is then deenergized in delayed response to opening of the circuit by the release means while the setting means moves toward its end position and the relay then permits a spring to move the pawl into engagement with a selected tooth of the setting means.

The novel features which are considered as characteristic of the invention are set forth in particular in the appended claims. The improved electric delay circuit itself, however, both as it its construction and its mode of operation, together with additional features and advantages thereof, will be best understood upon perusal of the following detailed description of certain specific embodiments with reference to the accompanying drawings, in which:

Figure 1:
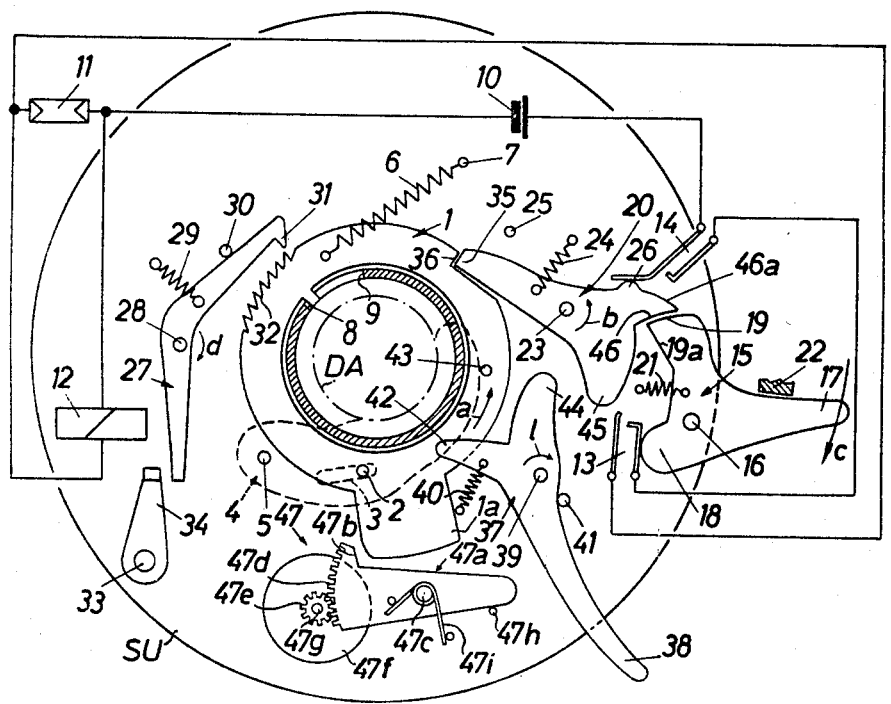
FIG. 1 is a fragmentary diagrammatic front elevational view of a first diaphragm mechanism which is combined with a first type of retard mechanism and with an electric delay circuit embodying one form of our invention.

Referring first to FIG. 1, there is shown a portion of a still camera which comprises a support SU for an exposure aperture setting member 1. This setting member 1 is formed as a ring which is rotatable about the longitudinal lens axis and carries pins 2 extending into elongated slots 3 provided in diaphragm vanes 4 (only one shown). Each vane 4 is pivotable on a pin 5 fixed to the support SU. The ring 1 is biased by a helical spring 6 one end of which is attached to a stud 7 carried by the support SU. It will be seen that the spring 6 tends to rotate the ring 1 in a clockwise direction, as viewed in FIG. 1, toward an end position determined by a fixed stop 9 which then abuts against a radial shoulder 8 of the ring 1. Such rotation of the ring 1 will result in a reduction in the size of the exposure aperture DA.

The electric delay circuit comprises a source 10 of electrical energy which may consist of one or more batteries or a miniature accumulator, a normally deenergized relay 12, a normally open main switch 13, a normally closed control switch 14, and a photoelectric resistor 11. The elements 10, 12, 13 and 14 of the delay circuit are connected in series and the resistor 11 is connected in parallel with the relay 12. This resistor 11 is mounted at the front side of the camera housing, preferably behind a positive lens or a honeycomb lens. The source 10 is preferably installed in the interior of the camera housing and the remaining elements 12, 13 and 14 of the delay circuit are preferably accommodated in the casing of the shutter mechanism.

The resistance of the photoelectric resistor 11 may be varied to take into account one or more factors which will influence the exposure. For example, one or more masking members may be provided to screen or mask a certain portion of the resistor 11 for the purpose of taking into account the exposure time, the film speed or other factors, as shown in the U.S. Patent 2,278,338. However, the illumination of the resistor 11 by the light coming from the viewed scene or object is not affected by the setting or selection of the exposure aperture.

In FIG. 1, the setting ring 1 is illustrated in cocked position from which it may be released by a release member here shown as a lever 15 which is rockable about a shaft 16 mounted on the support SU. This release lever 15 comprises three arms 17, 18, 19 the first of which serves as an actuating means and normally abuts against a fixed stop 22. The free end of the arm 17 may be engaged by a finger to move in the direction indicated by an arrow c. The arm 18 automatically closes the main switch 13 when the release lever 15 is rocked in a clockwise direction, and the arm 19 normally engages a blocking lever 20. That face of the arm 19 which engages the blocking lever 20 is of arcuate shape with its center of curvature located on the axis of the shaft 16. The release lever 15 is biased by a helical spring 21 which tends to maintain the arm 17 in abutment with the stop 22.

The blocking lever 20 is rockable about a fixed shaft 23 and is biased by a helical spring 24 so that it tends to rotate in a clockwise direction whereby its arm 46 abuts against the arm 19 of the release lever 15. If the arm 19 is disengaged from the arm 46, the spring 24 will move a second arm 35 of the blocking lever 20 into abutment with a stop pin 25 mounted on the support SU. The blocking cam 20 further comprises a trip or lobe 26 which normally prevents automatic closing of the control switch 14.

The relay 12 serves to rock an arresting member 27 which is a two-armed lever pivotable about a shaft 28 fixed to the support SU. The lever 27 is biased by a helical spring 29 which tends to maintain its upper arm in abutment with a fixed stop 30. The end portion of the upper arm of the arresting lever 27 carries a pawl 31 which can engage a selected tooth forming part of a toothed segment 32 extending along the periphery of the ring 1. When the relay 12 is energized, it attracts the lower arm of the arresting lever 27 whereby this arm rotates in a clockwise direction (arrow d) and causes the pawl 31 to engage a selected tooth of the segment 32. When the pawl 31 moves into engagement with a tooth of the segment 32, its lower arm rocks a shutter release lever 34 which is mounted on a shaft 33 forming part of the shutter mechanism. The exact construction of the remainder of the shutter mechanism (not shown) forms no part of our present invention.

The structure shown in FIG. 1 further comprises a cocking lever 37 which is rockable about a fixed shaft 39 and serves to move the ring 1 from the end position in which the shoulder 8 abuts against the stop 9 to the cocked position of FIG. 1 in which the arm 35 extends into a notch 36 provided in the periphery of the ring 1 and prevents rotation of this ring in a clockwise direction (under the bias of the spring 6). The arm 38 of the cocking lever 37 may be engaged by a finger to rotate the cocking lever in a clockwise direction (arrow l). A spring 40 tends to rotate the lever 37 in a counterclockwise direction so that the arm 38 normally abuts against a fixed stop 41. A second arm 42 of the cocking lever 37 is adapted to cooperate with a pin 43 mounted on the ring 1 and serving to rotate the ring in a counterclockwise direction (arrow a) when the lever 37 rotates in the direction indicated by the arrow l. The arm 42 and the pin 43 together constitute a motion transmitting device which cocks the setting ring 1 in response to clockwise rotation of the lever 37. A third arm 44 of the lever 37 cooperates with the arm 45 of the blocking lever 20 and rocks the lever 20 in the direction indicated by the arrow b when the arm 42 causes the setting ring 1 to rotate against the bias of the spring 6. The arrangement is such that the arm 44 engages the arm 45 only in the last stage of angular movement of the cocking lever 37, i.e., when the shoulder 8 is closely adjacent to the stop 9.

The structure of FIG. 1 operates as follows:

With the parts in positions shown in FIG. 1, the operator engages the actuating arm 17 of the release lever 15 and rotates this lever in a clockwise direction (arrow c) whereby the arm 18 of the release lever closes the main switch 13. However, the electric delay circuit is still open because the lobe 26 of the blocking lever 20 prevents closing of the control switch 14. As the release lever 15 continues to rotate in a clockwise direction, the arcuate face of the arm 19 slides along and away from the arm 46 of the blocking lever 20 whereby the spring 24 is free to rock the lever 20 in a clockwise direction (counter to that indicated by the arrow b) so that the control switch 14 closes and the arm 35 moves away from the notch 36 in the periphery of the setting ring 1. Thus, the setting ring is free to follow the bias of the spring 6 and rotates in a direction counter to that indicated by the arrow a. Such rotation of the setting ring 1 causes the vanes 4 to rotate about their fixed pins 5 in a sense (counterclockwise) to reduce the size of the exposure aperture DA.

As soon as the control switch 14 closes, it allows a current to flow in the delay circuit. The resistance of the photoelectric resistor 11 is a function of the intensity of light coming from the viewed scene or object, and such resistance will determine the exact time when the relay 12 is energized. If the intensity of light is greater, the resistance of the resistor 11 is relatively small so that the relay 12 is energized with a greater delay. Inversely, when the intensity of light coming from the viewed scene or subject is small, the resistor 11 offers a greater resistance to the flow of electric current and the relay 12 is energized with a shorter delay.

When the relay 12 is energized, it attracts the lower arm of the arresting lever 27 which then rotates in a clockwise direction (arrow d) so that the pawl 31 engages a selected tooth of the segment 32 whereby the rotation of the setting ring 1 is terminated in an intermediate position at the exact moment when the selected intermediate position deflects the intensity of light coming from the viewed scene or object. The lower arm of the arresting lever 27 then engages and rocks the shutter release lever 34 through an angle which suffices to release the shutter mechanism via shaft 33. In other words, the relay 12 not only selects the optimum exposure aperture DA (by causing the arresting lever 27 to halt the setting ring 1 in an intermediate angular position which is a function of the intensity of light coming from the scene or object), but the relay 12 also initiates the running down of the shutter mechanism.

Once the operator releases the lever 15, the spring 21 causes the face 19a of the arm 19 to abut against the face 46a of the arm 46, i.e., the blocking lever 20 remains in idle position because its arm 35 bears against the stop pin 25 under the bias of the spring 24. In setting up the camera for the next exposure, the operator rotates the cocking lever 37 (arrow l) whereby the arm 42 engages the pin 43 to rotate the setting ring 1 in a counterclockwise direction (arrow a) and the arm 44 engages the arm 45 to rotate the blocking lever 20 in a counterclockwise direction (arrow b). The arrangement is such that the arm 44 returns the blocking lever 20 to the position of FIG. 1 when the setting ring 1 already assumes the cocked position of FIG. 1 so that the arm 35 enters the notch 36 and fixes the setting ring in such cocked position. The lobe 26 opens the control switch 14 so that the delay circuit is open and the deenergized relay 12 allows the spring 29 to return the arresting lever 27 into abutment with the stop 30. The spring 21 causes the release lever 15 to return into abutment with the stop 22 whereby the arm 19 engages the concave face of the arm 46 and retains the blocking lever 20 in the illustrated blocking position.

In order to make sure that the arm 35 of the blocking lever 20 will inevitably enter the notch 36, the position of the pin 43 is selected in such a way that the arm 42 of the cocking lever 37 can move the setting ring 1 at least slightly beyond the cocked position of FIG. 1 (arrow a) so that the setting ring may perform a slight angular movement in a clockwise direction before the radial face in the notch 36 comes into actual abutment with the tip of the arm 35.

It is clear that the arms 17 and 38 may be omitted if the levers 15, 37 are arranged to be rotated by the shafts 16, 39. For example, the cocking lever 37 may be rigid with the shaft 39 and this shaft may be rotated by the cocking means for the shutter mechanism so that the cocking of the shutter mechanism takes place simultaneously with cocking of the setting ring 1. Alternatively, the shaft 39 may be rotated by the film transporting mechanism, or the same member which transports the film and which cocks the shutter mechanism can also serve to cock the setting ring 1 via shaft 39 and lever 37. Such arrangement is shown in FIG. 5 of the application S.N. 400,539, filed Sept. 30, 1964.

It is further clear that the present invention may be embodied in cameras whose diaphragm mechanism is different from the iris diaphragm mechanism shown in FIG. 1. For example, the diaphragm mechanism could comprise two slidable diaphragm vanes as shown in the application S.N. 267,433, filed Mar. 25, 1963, now Patent No. 3,196,-771, which are shiftable by a third slidable member. Also, the speed of rotation of the setting ring 1 under the bias of the spring 6 may be regulated by a retard mechanism 47 or 48. The retard mechanism 47 can be used to temporarily arrest the setting ring 1 at the very moment when the setting ring is released, and the retard mechanism 48 can be used to control the rotational speed of the setting ring during the entire interval between release by the arm 35 of the blocking lever 20 and engagement of the pawl 31 with a selected tooth of the segment 32.

The retard mechanism 47 is shown in FIG. 1. The setting ring 1 comprises a radially outwardly extending arm 1a which cooperates with an elongated retarding lever 47a having a projection or nose 47b located in the path of movement of the arm 1a when the setting ring 1 seeks to return to its rest position under the action of the spring 6. The lever 47a is mounted on a fixed shaft 47c and its left-hand end face, as viewed in FIG. 1, is provided with teeth, as at 47d, to form a toothed segment whose center of curvature is located on the axis of the shaft 47c. The teeth 47d mesh with the teeth of a pinion 47e which is coaxial with and is fixed to a rotary mass 47f. The parts 47e and 47f are free to rotate about the axis of a pin 47g mounted on the shutter supporting structure SU. The right-hand portion of the retarding lever 47a normally abuts against a fixed stop 47h because the lever is biased by a torsion spring 47i; which tends to rotate it in a clockwise direction, as viewed in FIG. 1.

The retard mechanism 47 will delay return movement of the setting ring 1 for an interval of time whose duration depends on the dimensions of the nose 47b, on the bias of the spring 47i; and on the dimensions and/or specific weight of the mass 47f.

Figure 1A:
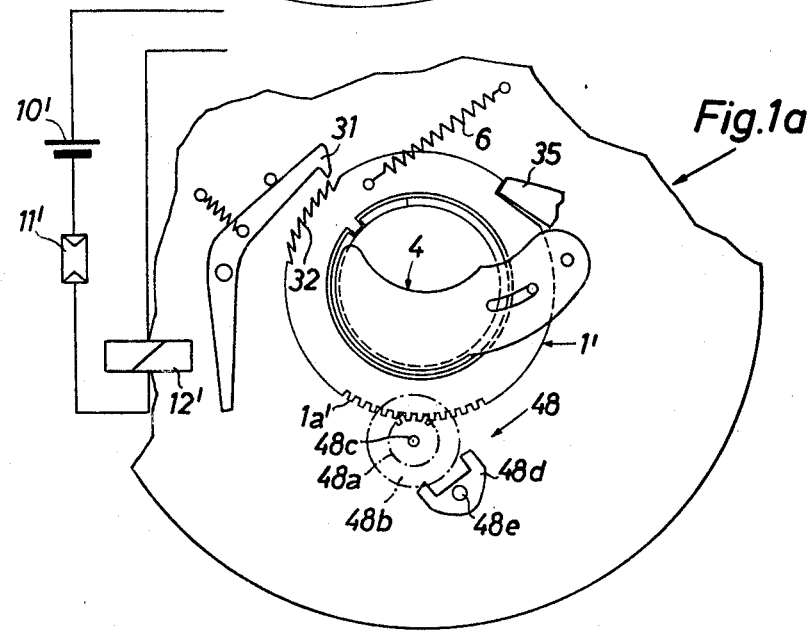
FIG. 1a is a fragmentary diagrammatic front elevational view of a diaphragm mechanism which is combined with a second type of retard mechanism.

The retard mechanism 48 is illustrated in FIG. 1a. This mechanism cooperates with a slightly modified setting ring 1' which is provided with a set of teeth 1a' forming an arcuate segment and meshing with the teeth of a pinion 48a. The pinion 48a is coaxially secured to an escapement wheel 48b and the parts 48a, 48b are rotatable about the axis of a stationary shaft 48c. The wheel 48b cooperates with an escapement anchor 48d which is oscillatable about the axis of a shaft 48e.

The design of the mechanism 48 is such that the setting ring 1' is retarded in a substantially uniform manner throughout its entire return movement from its cocked position to its rest position.

When the setting ring 1' is cocked, the vanes 4 define an aperture of minimum size. If the user wishes to make an exposure, the blocking lever is caused to move its arm 35 away from the notch 36 and the circuit of the energy source 10', photosensitive resistor 11' and relay 12' is completed. When the intensity of scene light is high, the resistor 11' (which is in series with the relay 12') offers a low resistance to the flow of current and the relay 12' is energized with a short delay so that the pawl 31 engages and arrests the ring 1' after a relatively short angular displacement from cocked position, i.e., the vanes 4 then define a relatively small aperture. If the intensity of scene light is low, the resistance of the resistor 11' is high and the relay 12' is energized with a greater delay. The ring 1' then causes the vanes 4 to define a larger aperture.

Retard mechanisms similar to those shown in FIGS. 1 and 1a are shown in our copending application Ser. No. 400,539.

Figure 2:
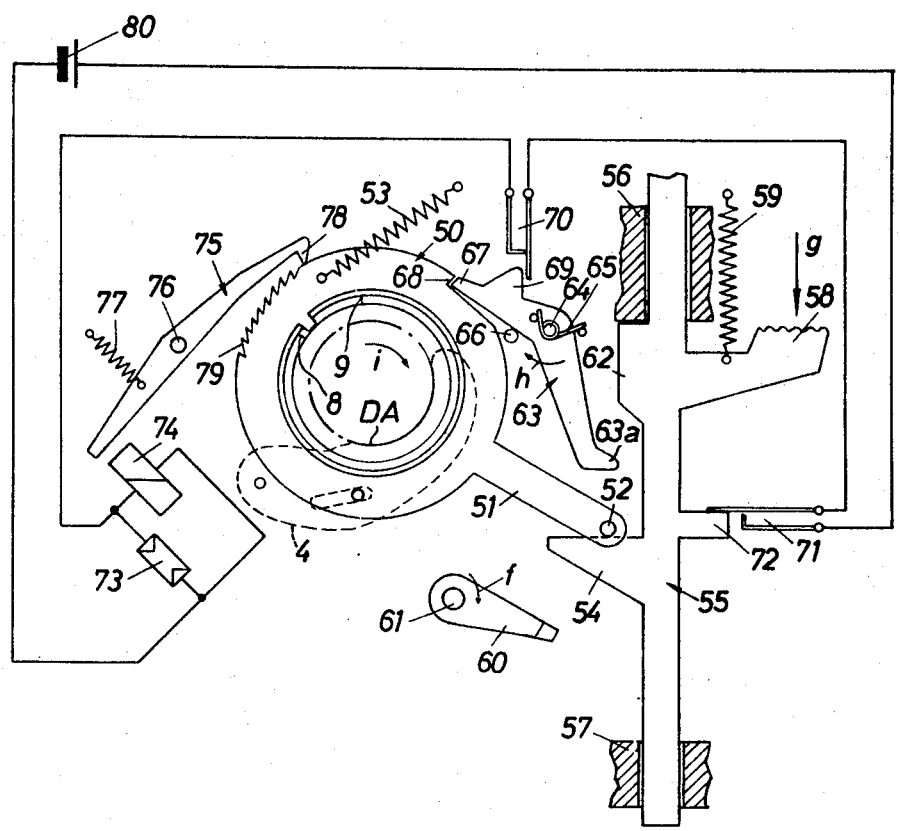
FIG. 2 is a diagrammatic front elevational view of a further diaphragm mechanism which is combined with a modified delay circuit.

Referring now to FIG. 2, there is shown a modified iris diaphragm mechanism including an exposure setting ring 50. This setting ring serves to control the angular position of a series of diaphragm vanes 4 mounted in the same way as in the diaphragm mechanism of FIG. 1. The setting ring 50 comprises a radially outwardly extending projection or arm 51 whose free end carries a pin-shaped follower 52. A helical spring 53 biases the setting ring 50 in a clockwise direction, as viewed in FIG. 2, so that the follower 52 abuts against a laterally extending lug 54 forming part of a reciprocable release member 55. This release member is guided in fixed bearings 56, 57 and comprises a manually operable actuating arm 58 which may be depressed by a finger to displace the member 55 in the direction indicated by an arrow g whereby the member 55 moves against the bias of a helical return spring 59 which tends to maintain a cam 62 in abutment with a fixed stop, in the present instance against the bearing 56. The arm 58 extends from the camera housing and the bias of the spring 59 is stronger than the bias of the spring 53.

The lug 54 also serves to trip a release lever 60 for the shutter mechanism whereby the lever 60 rotates the shaft 61 of the shutter mechanism (arrow f) in order to permit running-down of the shutter.

The cam 62 is adapted to rock a blocking lever 63 which is rockable on a shaft 64 and is biased by a torsion spring 65 so that it normally tends to rotate in a counterclockwise direction, as viewed in FIG. 2. The lower arm of the blocking lever 63 has a tip 63a which extends into the pathway of the cam 62 and is engaged by this cam when the release member 55 is shifted in the direction indicated by the arrow g. The upper arm 67 of the blocking lever 63 normally extends into a peripheral notch 68 of the setting ring 50 to hold this ring in cocked position. The lever 63 then abuts against a fixed stop pin 66. The arm 67 need not come in actual abutment with the setting ring 50 as long as it extends into the path of the radial face bounding a portion of the notch 68.

The blocking lever 63 further comprises a trip or lobe 69 which can open a normally closed control switch 70 forming part of the electric delay circuit. This circuit also comprises a normally open main switch 71 (which tends to close in a fully automatic way when its movable contact is disengaged from a trip 72 of the release member 55), a source 80 of electrical energy, a normally deenergized relay 74 and a photoelectric resistor 73. The elements 70, 71, 74, 80 are connected in series, and the resistor 73 is connected in parallel with the relay 74. The resistor 73 is mounted in the same way as described in connection with FIG. 1, i.e., it is located at the front side of the camera housing for illumination by light coming from the viewed scene or object.

The relay 74 may be energized to rock an arresting lever 75 which is biased by a helical spring 77 and is rockable on a fixed shaft 76. The arrangement is such that the pawl 78 of the arresting lever 75 normally abuts against the periphery of the setting ring 50, and this setting ring is again provided with a toothed segment 79. When the relay 74 is energized, it causes the lever 75 to move its pawl 78 away from the periphery of the setting ring 50 or out of engagement with a selected tooth of the segment 79.

In order to make an exposure, the operator using the camera which embodies the structure of FIG. 2 proceeds as follows:

The release member 55 is depressed through the intermediary of the actuating arm 58 so that it moves in the direction indicated by the arrow g. Thus the trip 72 moves away from the movable contact of the main switch 71 and this switch closes to complete the electric delay circuit. The relay 74 is energized and causes the arresting level 75 to move its pawl 78 away from the periphery of the cocked setting ring 50. The release member 55 continues to move in the direction indicated by the arrow g whereby the cam 62 engages the tip 63a of the blocking lever 63 and causes this lever to rotate in a clockwise direction (arrow h) so that the arm 67 moves away from the notch 68 and allows the setting ring 50 to rotate under the bias of the spring 53 (arrow i). Immediately before the arm 67 moves out of the notch 68 (i.e., immediately before the setting ring 50 is free to rotate in the direction indicated by the arrow i), the lobe 69 opens the control switch 70 so that the delay circuit is open. However, the relay 74 remains energized for an interval of time determined by the resistance of the photoelectric resistor 73. This will be readily understood because a current continues to flow in that part of the circuit which includes the relay 74 and resistor 73 even if the control switch 70 is open. The delay in deenergization of the relay 74 is a function of illumination of the photoelectric resistor 73 by the light coming from the viewed scene or object. If the resistance of the resistor 73 is very high, namely, if the illumination of this resistor by the light coming from the scene or object is weak, the relay 74 is deenergized with a shorter delay. Inversely, when the illumination of the resistor 73 is rather intensive, the resistance of the resistor decreases and the relay 74 is deenergized with a greater delay.

As soon as the relay 74 is deenergized, the arresting lever 75 is free to follow the bias of the spring 77 and moves the pawl 78 into engagement with a selected tooth of the segment 79 so that the setting ring 50 is arrested in an intermediate angular position which is a function of the intensity of light coming from the viewed scene or object. If the relay 74 is deenergized with a minimum of delay, the size of the exposure aperture DA is reduced very little or not at all. However, if the relay 74 is deenergized with a considerable delay, the setting ring 50 causes the vanes 4 to assume an angular position in which they define an exposure aperture of greatly reduced size. Such substantial reduction in the size of the exposure aperture DA will take place when the intensity of light coming from the viewed scene or object is very high so that the resistance of the resistor 73 is low.

As the release member 55 continues to move in the direction indicated by the arrow g, the lug 54 engages the release lever 60 and causes this lever and the shaft 61 to rotate in the direction indicated by the arrow f whereby the shutter mechanism allows the light passing through the aperture DA to reach the film. This completes the cycle, i.e., the camera has made an exposure and the operator releases the actuating arm 58 so that the member 55 can follow the bias of the spring 59 and automatically returns to the idle or inactive position of FIG. 2 in which the cam 62 abuts against the bearing 56. During such return movement of the release member 55, the lug 54 causes the follower 52 to rock the arm 51 and to rotate the setting ring 50 in a counterclockwise direction so that the setting ring returns to the cocked position of FIG. 2 whereby the spring 65 causes the arm 67 of the blocking lever 63 to reenter the notch 68 and to hold the setting ring against rotation under the bias of the spring 53. Thus, the diaphragm mechanism is ready for the next exposure. The main switch 71 is held open by the trip 72 but the control switch 70 is free to close because its movable contact is released by the lobe 69. Thus, when the setting ring 50 is cocked, the circuit of the source 80 opens automatically to conserve the energy.

The structure of FIG. 2 may be modified in the same way as described in connection with FIG. 1. Thus, the setting ring 50 may be cocked by the film transporting mechanism or by a member which cocks the shutter mechanism, and the illustrated diaphragm mechanism may be replaced by one having two slidable vanes. It is also within the scope of our invention to utilize electric delay circuits which include transistor amplifiers or the like. If the delay circuit is used in a camera with a viewfinder, the exposure aperture setting or selecting member may be constructed in such a way that it opens the diaphragm mechanism at the exact moment of release.

It will be noted that, in order to arrest the setting ring 50 in a selected intermediate position, the condition of the relay 74 shown in FIG. 2 must change from a condition of energization to a condition of deenergization. The circuit of FIG. 2 is first completed and is thereupon opened whenever the operator depresses the release member 55, and the delay between the opening of the circuit and the actual change in condition of the relay 74 (from energized to deenergized) will determine the exact size of the exposure aperture DA, i.e., that intermediate position of the setting ring 50 which is a function of the intensity of light coming from the viewed scene or object.

In FIG. 1, the lever 27 arrests the setting ring 1 in a selected intermediate position in response to a different change in condition of the relay 12 (from deenergized to energized), and such change in condition of the relay 12 takes place with a delay whose length is a function of illumination of the photoelectric resistor 11 by light coming from the viewed scene or object so that the exact size of the exposure aperture DA is again properly related to the intensity of light impinging upon the resistor 11.

The exposure aperture selecting arrangement of our invention may be used in single-lens reflex cameras as well as in regular candid cameras. Since it comprises a relatively small number of parts, it occupies little room in a camera and can withstand extended use without ill effects on its accuracy. When used in a single-lens reflex camera, it brings about the advantage that the camera need not be provided with separate means to open the diaphragm mechanism during viewing of the object or scene.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. In a camera, a diaphragm mechanism including vane means defining a variable exposure aperture; setting means connected with said vane means and movable through a plurality of intermediate positions between a cocked position and an end position to change the size of said aperture during such movement, said setting means having a plurality of teeth, one for each of said intermediate positions; resilient means for biasing said setting means to said end position; an electric delay circuit including a source of electrical energy, photoelectric resistor means positioned for illumination by light coming from the viewed scene so that the resistance of said resistor means is a function of the intensity of said light, and relay means connected in parallel with said resistor means, said relay means being arranged to assume conditions of energization and deenergization and to change its condition with a delay which is a function of the resistance of said resistor means; arresting means having a pawl movable into arresting engagement with one of said teeth in response to change in condition of said relay means; blocking means for normally blocking said setting means in cocked position; and release means for disengaging said blocking means from said setting means and for at least temporarily closing said circuit so that the delayed change in the condition of said relay means takes place in that intermediate position of said setting means in which the size of said aperture is a function of said intensity.

2. In a camera, a diaphragm mechanism including movable vane means defining a variable exposure aperture; setting means connected with said vane means and automatically movable through a series of intermediate positions from a cocked position to an end position for changing the size of said aperture; movable blocking means for normally blocking movement of said setting means from cocked position; an electric delay circuit including a source of energy; a control switch connected in series with said source and actuatable by said blocking means, a relay connected in series with said switch, and photoelectric resistor means connected in parallel with said relay being arranged to assume conditions of ener- from the viewed scene so that the resistance of said resistor means is a function of the intensity of said light, said relay being arranged to assume conditions of energization and deenergization and to change its condition in response to actuation of said switch with a delay which is a function of the resistance of said resistor means; arresting means for arresting said setting means in an intermediate position in response to change in condition of said relay; and release means for disengaging said blocking means from said setting means whereby said blocking means actuates said switch so that the delayed change in condition of said relay takes place in that intermediate position of said setting means in which the size of said aperture is a function of said intensity.

3. In a camera, a diaphragm mechanism including movable vane means defining a variable exposure aperture; setting means connected with said vane means and automatically movable through a series of intermediate positions from a cocked position to an end position for changing the size of said aperture; blocking means comprising a blocking lever for normally blocking movement of said setting means from cocked position, said lever being rockable to a position of disengagement from said setting means; an electric delay circuit including a source of energy, a control switch connected in series with said source and actuatable by said blocking means in response to disengagement of said lever from said setting means, a relay connected in series with said switch, and photoelectric resistor means connected in parallel with said relay and positioned for illumination by the light from the viewed scene so that the resistance of said resistor means is a function of the intensity of said light, said relay being arranged to assume conditions of energization and deenergization and to change its condition in response to actuation of said switch with a delay which is a function of the resistance of said resistor means; arresting means for arresting said setting means in an intermediate position in response to change in condition of said relay; and release means for disengaging said lever from said setting means whereby said lever actuates said switch so that the delayed change in condition of said relay takes place in that intermediate position of said setting means in which the size of said aperture is a function of said intensity.

4. In a camera, a diaphragm mechanism including movable vane means defining a variable exposure aperture; setting means connected with said vane means and movable through intermediate positions between a cocked position and an end position to change the size of said aperture during such movement; relatively weak first resilient means for permanently biasing said setting means to said end position; an electric delay circuit including a source of energy, photoelectric resistor means positioned for illumination by light from the viewed scene so that the resistance of said resistor means is a function of the intensity of said light, and relay means arranged to assume conditions of energization and deenergization and to change its condition with a delay which is a function of the resistance of said resistor means; arresting means for arresting said setting means in response to change in condition of said relay means; release means movable in a first direction for initiating movement of said setting means from cocked position and for at least temporarily completing said circuit so that the delayed change in condition of said relay means takes place in that intermediate position of said setting means in which the size of said aperture is a function of said intensity; relatively strong second resilient means for moving said release means in the opposite direction; and motion transmitting means provided on said release means and said setting means for returning said setting means to cocked position against the bias of said first resilient means and in response to movement of said release means under the bias of said second resilient means.

5. In a camera, a diaphragm mechanism including movable vane means defining a variable exposure aperture; setting means connected with said vane means and movable through intermediate positions between a cocked position and an end position to change the size of said aperture during such movement; an electric delay circuit including a source of energy, relay means, photoelectric resistor means connected in parallel with said relay means and positioned for illumination by the full light coming from the viewed scene so that the resistance of said resistor means is a function of the intensity of said light, normally open main switch means connected in series with said source, and normally closed control switch means connected in series with said main switch means, said relay means being arranged to assume conditions of energization and deenergization and to change its condition with a delay which is a function of the resistance of said resistor means; arresting means for arresting said setting means in response to delayed energization of said relay means; release means actuatable for initiating movement of said setting means from cocked position and for simultaneously closing said main switch means so that the delayed energization of said relay means occurs in that intermediate position of said setting means in which the size of said aperture is a function of said intensty; and means for opening said control switch means subsequent to closing of said main switch means in response to actuation of said release means.

6. In a photographic camera, in combination, a diaphragm mechanism including movable vane means defining a variable exposure aperture; setting means connected with said vane means and movable through a plurality of intermediate positions between a cocked position and an end position to change the size of said aperture during such movement; means for biasing said setting means to said end position; means for normally blocking the movement of said setting means from said cocked position; a normally open delay circuit comprising a source of energy, a photoelectric resistor positioned for illumination by light from the viewed scene so that the resistance of said resistor is a function of the intensity of said light, and a normally deenergized relay connected in parallel with said resistor, said relay being energized in response to completion of said circuit and with a delay which is a function of the resistance of said resistor; arresting means for arresting the movement of said setting means in one of said intermediate positions in response to energization of said relay; and release means for disengaging said blocking means from said setting means and for effecting completion of said circuit independently of said setting means so that the delayed energization of said relay occurs in that intermediate position of said setting means in which the size of said aperture is a function of said intensity.

7. In a photographic camera, in combination, a diaphragm mechanism including movable vane means defining a variable exposure aperture; setting means connected with said vane means and movable through a plurality of intermediate positions between a cocked position and an end position to change the size of said aperture during such movement; means for biasing said setting means to said end position; means for normally blocking the movement of said setting means from said cocked position; a normally open delay circuit comprising a source of energy, a photoelectric resistor positioned for illumination by light from the viewed scene so that the resistance of said resistor is a function of the intensity of said light, and a normally deenergized relay connected in parallel with said resistor, said relay being energized in response to completion of said circuit and with a delay which is a function of the resistance of said resistor; arresting means for arresting the movement of said setting means in one of said intermediate positions in response to energization of said relay; release means for disengaging said blocking means from said setting means and for effecting completion of said circuit independently of said setting means so that the delayed energization of said relay occurs in that intermediate position of said setting means in which the size of said aperture is a function of said intensity; and means for returning said setting means to cocked position upon completion of an exposure.

8. In a photographic camera, in combination, a diaphragm mechanism including movable vane means defining a variable exposure aperture; setting means connected with said vane means and movable through a plurality of intermediate positions between a cocked position and an end position to change the size of said aperture during such movement; means for biasing said setting means to said end position; means for normally blocking the movement of said setting means from said cocked position; a normally open delay circuit comprising a source of energy, a photoelectric resistor positioned for illumination by light from the viewed scene so that the resistance of said resistor is a function of the intensity of said light, and a normally deenergized relay connected in parallel with said resistor, said relay being energized in response to completion of said circuit and being deenergized in response to subsequent opening of said circuit with a delay which is a function of the resistance of said resistor; arresting means for arresting said setting means in one of said intermediate positions in response to delayed energization of said relay; and release means actuatable for disengaging said blocking means from said setting means so that said setting means is free to move from said cocked position, for thereupon completing said circuit, and for subsequently opening said circuit so that the delayed deenergization of said relay occurs in that intermediate position of said setting means in which the size of said aperture is a function of said intensity.

9. A structure as set forth in claim 8, further comprising means for permanently biasing said arresting means into engagement with said setting means, said relay being arranged to disengage said arresting means from said setting means when energized on completion of said circuit so that, while the relay is energized, the setting means is free to move from said cocked position.

10. A structure as set forth in claim 8, further comprising means for automatically returning said release means to a starting position, and motion transmitting means for automatically cocking said setting means in response to such return movement of said release means.

References Cited

UNITED STATES PATENTS

| | | | |
|---|---|---|---|
| 2,978,970 | 4/1961 | Fahlenberg | 95—10 XR |
| 3,000,281 | 9/1961 | Rentschler | 95—10 |
| 3,176,598 | 4/1965 | Muller et al. | 95—10 |
| 3,205,795 | 9/1965 | Grey | 95—10 |
| 3,253,523 | 5/1966 | Hutchinson | 95—10 |
| 3,270,650 | 9/1966 | Ernisse | 95—10 XR |
| 3,295,429 | 1/1967 | Stimson | 95—10 XR |

NORTON ANSHER, *Primary Examiner.*

JOSEPH F. PETERS, *Assistant Examiner.*